United States Patent
Hu

(10) Patent No.: US 10,728,109 B1
(45) Date of Patent: Jul. 28, 2020

(54) HIERARCHICAL NAVIGATION THROUGH NETWORK FLOW DATA

(71) Applicant: Illumio, Inc., Sunnyvale, CA (US)

(72) Inventor: Xianlin Hu, Santa Clara, CA (US)

(73) Assignee: Illumio, Inc., Sunnyvale, CA (US)

( * ) Notice: Subject to any disclaimer, the term of this patent is extended or adjusted under 35 U.S.C. 154(b) by 115 days.

(21) Appl. No.: 15/460,158

(22) Filed: Mar. 15, 2017

(51) Int. Cl.
*H04L 12/26* (2006.01)
*H04L 12/24* (2006.01)
*H04L 29/06* (2006.01)

(52) U.S. Cl.
CPC .......... *H04L 41/22* (2013.01); *H04L 41/0813* (2013.01); *H04L 67/42* (2013.01)

(58) Field of Classification Search
CPC .......... G06F 19/00; G06F 12/14; G06F 16/84; G06F 3/048; G06F 3/04842; G06F 16/51; G06F 16/9024; G06F 16/9038; G06F 3/04815; G06T 11/206
USPC ....................... 709/224; 726/3; 345/440, 594
See application file for complete search history.

(56) References Cited

U.S. PATENT DOCUMENTS

| | | | | |
|---|---|---|---|---|
| 7,930,746 | B1* | 4/2011 | Sheleheda | H04L 63/1425 713/151 |
| 2001/0049678 | A1* | 12/2001 | Yaginuma | G06F 16/283 |
| 2007/0005582 | A1* | 1/2007 | Navratil | G06F 17/30398 |
| 2007/0118909 | A1* | 5/2007 | Hertzog | G06F 21/552 726/23 |
| 2010/0191678 | A1* | 7/2010 | Steed | G06T 11/206 706/11 |
| 2012/0229468 | A1* | 9/2012 | Lee | G06F 9/451 345/440 |
| 2013/0222387 | A1* | 8/2013 | Bradshaw | G06T 11/206 345/440 |
| 2015/0039751 | A1* | 2/2015 | Harrigan | H04L 43/045 709/224 |
| 2018/0234310 | A1* | 8/2018 | Ingalls | H04L 43/12 |

OTHER PUBLICATIONS

Goodall et al.; Focusing on Context in Network Traffic Analysis; Mar. 2006; IEEE Computer Society; pp. 1-9 (Year: 2006).*
Tricaud et al.; Visualizing Network Activity using Parallel Coordinates; IEEE—Proceedings of the 44th Hawaii International Conference on System Sciences; 2011; pp. 1-8 (Year: 2011).*

* cited by examiner

*Primary Examiner* — Tonia L Dollinger
*Assistant Examiner* — Linh T. Nguyen
(74) *Attorney, Agent, or Firm* — Fenwick & West LLP

(57) ABSTRACT

A system performs hierarchical navigation through network flow data. A user interface is configured to display network flow data and allow hierarchical navigation across the network flow data. The user interface comprises a plurality of axes and lines connecting data points between axes. Data points along an axis represent values of an attribute aggregated along a set of dimensions. The system receives requests for expanding data points along a particular dimension or collapsing the data points along the particular dimension. The system reconfigures the user interface according to the received request and sends the reconfigured user interface for display via the client device. The user interface provides better visibility into the network flow data, thereby allowing security analysts to spot communication patterns associated with security issues and navigate through various dimensions to further analyze a suspect communication pattern.

20 Claims, 13 Drawing Sheets

440

Modify the set of dimensions corresponding to the particular axis by adding a dimension to the set in response to a request to expand the data points or by removing a dimension from the set in response to a request to collapse a dimension
810

Determine a new set of data points for the particular axis by aggregating the attribute value along the modified set of dimensions
820

Replace the data points of the particular axis with the new set of data points
830

Replace the lines connecting data points of the particular axis with lines connecting the replaced data points
840

HIERARCHICAL NAVIGATION THROUGH NETWORK FLOW DATA

BACKGROUND

1. Technical Field

The subject matter described herein generally relates to analysis of network flow data generated by computer networks and in particular to interactive tools for hierarchical navigation of network flow data generated by a distributed system.

2. Background Information

Servers (physical or virtual) of an administrative domain communicate with each other via a computer network. Various policies govern the network traffic of the administrative domain. For example, a policy may concern network security for the administrative domain. System administrators analyze the communications to identify issues with the communications. For example, certain communication patterns may be indicative of issues related to network security. Analysis of such communication patterns helps in selection of network security policies.

System administrators use tools for analyzing network communications. Analysis of network communications, even for a moderately-sized enterprise, can be challenging due to the number of communications between servers. There can be thousands of communications associated with each server over a short time period and thousands of servers communicating with each other. Identifying network security issues involving the communications is difficult. Conventional techniques fail to present network flow data in a manner that allows a system administrator to easily analyze the communications. As a result, the system administrator has to spend significant amount of time analyzing the network flow data to identify any security issues. In addition, the system administrator might fail to identify some security issues and implement inefficient or insecure network security policies due to faulty data flow analysis. The enterprise network is thus potentially vulnerable to attack by malicious entities.

SUMMARY

The above and other issues are addressed by a method, non-transitory computer-readable storage medium, and system for hierarchical navigation of network flow data.

An embodiment of the method performs hierarchical navigation of network flow data. Network flow data describing communications between servers is annotated with metadata describing the servers. A user interface is configured to display the annotated network flow data. The user interface comprises a plurality of axes and lines connecting data points between axes. Each axis represents an attribute describing communications between servers. Each axis is associated with a set of server dimensions, each server dimension representing a characteristic of a server. Data points along an axis represent values of the attribute aggregated along the set of server dimensions. Data points across axes associated with the same communication are connected with lines. The configured user interface is sent for display via a client device.

An embodiment of a computer readable non-transitory storage medium stores instructions for performing the following steps. The steps comprise receiving network flow data describing communications between servers and annotating the data with metadata describing the servers. The steps further comprise configuring a user interface to display the annotated network flow data. The user interface comprises a plurality of axes and lines connecting data points between axes. Each axis represents an attribute describing communications between servers. Each axis is associated with a set of server dimensions, each server dimension representing a characteristic of a server. Data points along an axis represent values of an attribute aggregated along the set of server dimensions. Data points across axis that associated with the same communication are connected with lines. The steps further comprise sending the configured user interface for display via a client device.

An embodiment of a computer system comprises one or more processors and a computer readable non-transitory storage medium storing instructions for execution by the one or more processors. The computer readable non-transitory storage medium stores instructions for performing the following steps. The steps comprise receiving network flow data describing communications between servers and annotating the data with metadata describing the servers. The steps further comprise configuring a user interface to display the annotated network flow data. The user interface comprises a plurality of axes and lines connecting data points between axes. Each axis represents an attribute describing communications between servers. Each axis is associated with a set of server dimensions, each server dimension representing a characteristic of a server. Data points along an axis represent values of an attribute aggregated along the set of server dimensions. Data points across axis that associated with the same communication are connected with lines. The steps further comprise sending the configured user interface for display via a client device.

BRIEF DESCRIPTION OF THE DRAWINGS

FIG. 8 shows a flowchart illustrating the process of reconfiguring the user interface in response to a request for hierarchical navigation through network flow data, according to an embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Embodiments of the invention allow a security analyst to navigate through the network flow data in order to analyze security issues. The visualization of the network flow data as a chart, for example, a parallel coordinates graph, allows a security analyst to easily spot communication patterns that may be associated with security issues. Navigating through various dimensions allows a security analyst to further analyze the suspect communication patterns to confirm whether the communication pattern is actually caused by a security issue. Furthermore, if the communication pattern is caused by a security issue, the user interface assists the security analyst in identifying the security issue by providing better visibility into the network flow data.

Embodiments allow a security analyst to visualize the communication patterns in terms of labels representing high level characteristics of servers. This allows the security analyst to implement administrative domain wide security policies expressed in terms of these labels, for example, to address the identified security issues. For example, if a security issue is identified based on communications from a set of source servers specified using a first set of labels to a set of destination servers specified using a second set of labels, the security analyst may implement an administrative domain wide security policy specified using the first set of labels and the second set of labels. The administrative domain wide security policy may change the protocol used for communications from set of source servers having the first set of labels to set of destination servers having the second set of labels. Alternatively, the administrative domain wide security policy may perform enhanced security checks on communications from the set of source servers to the set of destination servers or prevent certain types of communications that are determined to be associated with security hazards from taking place at all.

Figure 1:
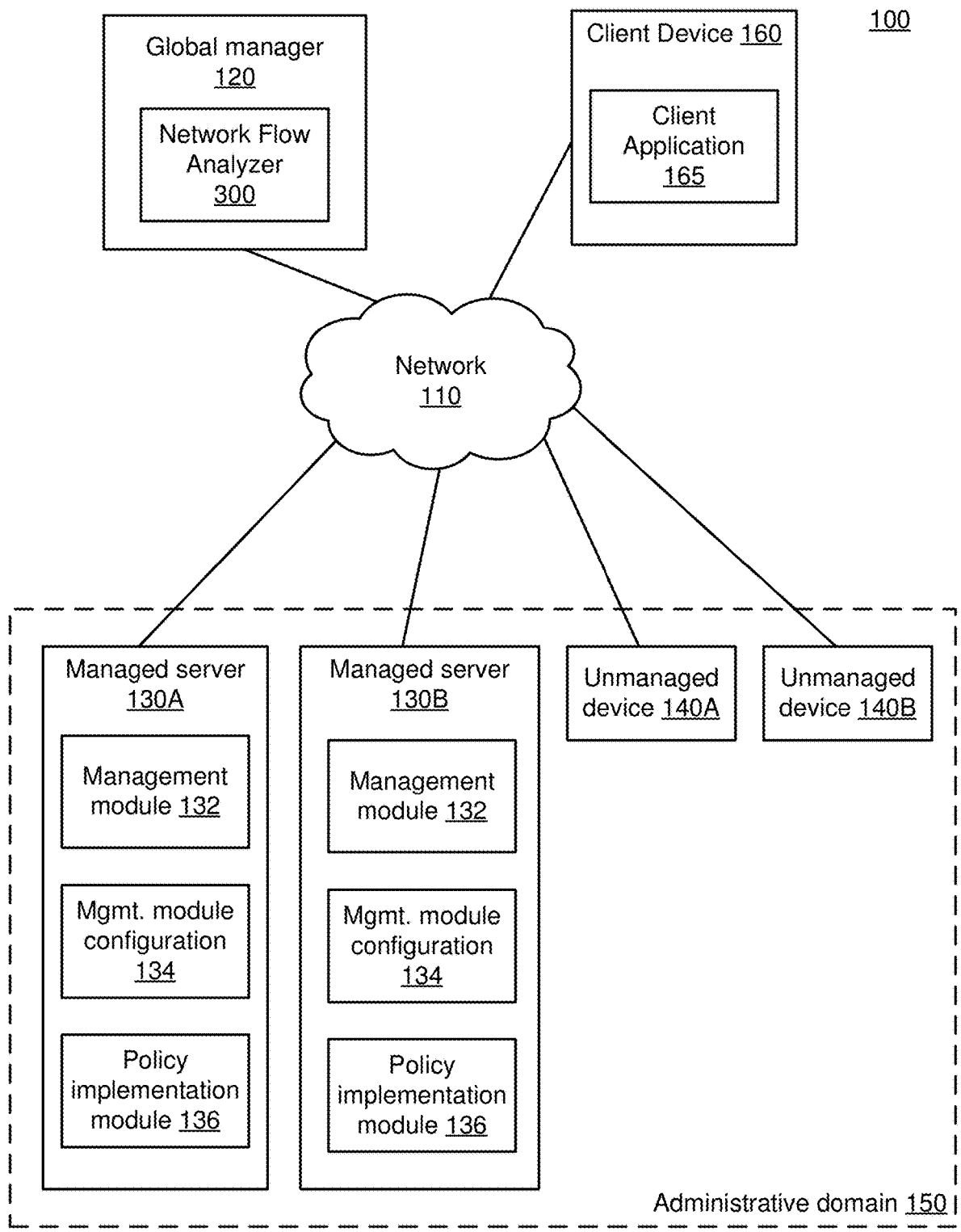
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) 130 of an administrative domain 150, according to one embodiment. The administrative domain 150 can correspond to an enterprise such as, for example, a service provider, a corporation, a university, or a government agency. The environment 100 may be maintained by the enterprise itself or by a third party (e.g., a second enterprise) that helps the enterprise manage its servers 130. Security analysts analyze communications between servers of the administrative domain to identify security issues and implement security policies to overcome any security issues identified.

As shown, the environment 100 includes a network 110, a global manager 120, one or more client devices 160, multiple managed servers 130, and multiple unmanaged devices 140. An unmanaged device is also referred to as an unmanaged server. The multiple managed servers 130 and the multiple unmanaged devices 140 are associated with the administrative domain 150. For example, they are operated by the enterprise or by a third party (e.g., a public cloud service provider) on behalf of the enterprise. While one global manager 120, two managed servers 130, and two unmanaged devices 140 are shown in the embodiment depicted in FIG. 1 for clarity, other embodiments can have different numbers of global managers 120, managed servers 130, and/or unmanaged devices 140.

The network 110 represents the communication pathway between the global manager 120, the managed servers 130, and the unmanaged devices 140. In one embodiment, the network 110 uses standard communications technologies and/or protocols and can include the Internet. In another embodiment, the entities on the network 110 can use custom and/or dedicated data communications technologies.

The client device 160 is a computing device used by a user for interacting with the global manager 120. The client device 160 executes a client application 165 that presents user interfaces to a user for interacting with the global manager 120. For example, the client application 165 may render and display various user interfaces for visualizing network flow data as described herein. The client device 160 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, the client application 165 is a browser application that receives markup language documents from the global manager 120, for example, hypertext markup language (HTML) documents for configuring user interfaces and presents the user interfaces as described in the received markup language documents.

A managed server 130 is a machine (physical or virtual) that implements an administrative domain-wide management policy. In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy specifies whether and/or how entities associated with the administrative domain 150 are allowed to access (or be accessed by) other entities or otherwise consume (or provide) services. For example, the administrative domain-wide management policy specifies security or resource usage. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy. The management module configuration 134 generated by the policy implementation module 136 implements that administrative domain-wide management policy (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

An unmanaged device 140 is a computer (or set of computers) that does not include a policy implementation module 136. An unmanaged device 140 does not implement the administrative domain-wide management policy. However, interaction between a managed server 130 and an unmanaged device 140 can be subject to the administrative domain-wide management policy (as implemented by the managed server 130). One example of an unmanaged device 140 is a network circuit that is used by an administrative domain 150. Another example of an unmanaged device 140 is a device used by a person to authenticate himself to the administrative domain 150 (e.g., a notebook or desktop computer, a tablet computer, or a mobile phone).

The global manager 120 is a computer (or set of computers) that generates management instructions for managed servers 130 and sends the generated management instructions to the servers. The global manager 120 includes a network flow analyzer 300 for processing network flow data. The network flow analyzer 300 is further described in detail in FIG. 3. The management instructions are generated based on a) the state of the administrative domain's computer network infrastructure and b) an administrative domain-wide management policy. The state of the administrative domain's computer network infrastructure includes descriptions of managed servers 130 and (optionally) descriptions of unmanaged devices 140. The global manager 120 also processes local state information received from managed servers 130.

The administrative domain-wide management policy is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
|---|---|
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy (to the extent that the policy concerns the managed server 130). As a result, the administrative domain-wide management policy is applied in a distributed fashion throughout the administrative domain 150, and there are no choke points. Also, the administrative domain-wide management policy is applied at the logical level independent of the administrative domain's physical network topology and network addressing schemes.

In one embodiment, the global manager 120 includes a network flow analyzer 300 that collects network flow data describing communications between servers and allows a security analyst to analyze the network flow data using high-level characteristics of servers performing the communications. The global manager 120 presents information describing the network flow data to a user, for example, a security analyst via the client application 165 executing on a client device 160. A security analyst may analyze the network flow data to identify security issues and implement appropriate security policies.

The network flow analyzer 300 annotates the network flow data with labels describing dimensions that represent high-level characteristics of servers performing the communication. Accordingly, the network flow analyzer 300 allows a security analyst to analyze the network flow data in terms of dimensions describing the servers. For example, the network flow analyzer 300 allows a system administrator to filter the network flow data using criteria based on dimensions of the servers. The network flow analyzer 300 also allows a security analyst to perform hierarchical navigation through the network flow data across dimensions. Conventional tools present the network flow data in terms of low level attributes of the communications, for example, IP (internet protocol) addresses of the source and destination of servers. As a result, a security analyst using conventional tools can only visualize network flow data at a low level, for example, anomalous communication patterns associated with specific IP addresses. In contrast, the network flow analyzer 300 allows a security analyst to perform analysis using high-level characteristics of servers, for example, by identifying anomalous communication patterns across sets of servers having particular roles, applications, locations, or environment. This allows a security analyst to identify security issues using server dimensions and also establish security policies using the server dimensions.

Computer

Figure 2:
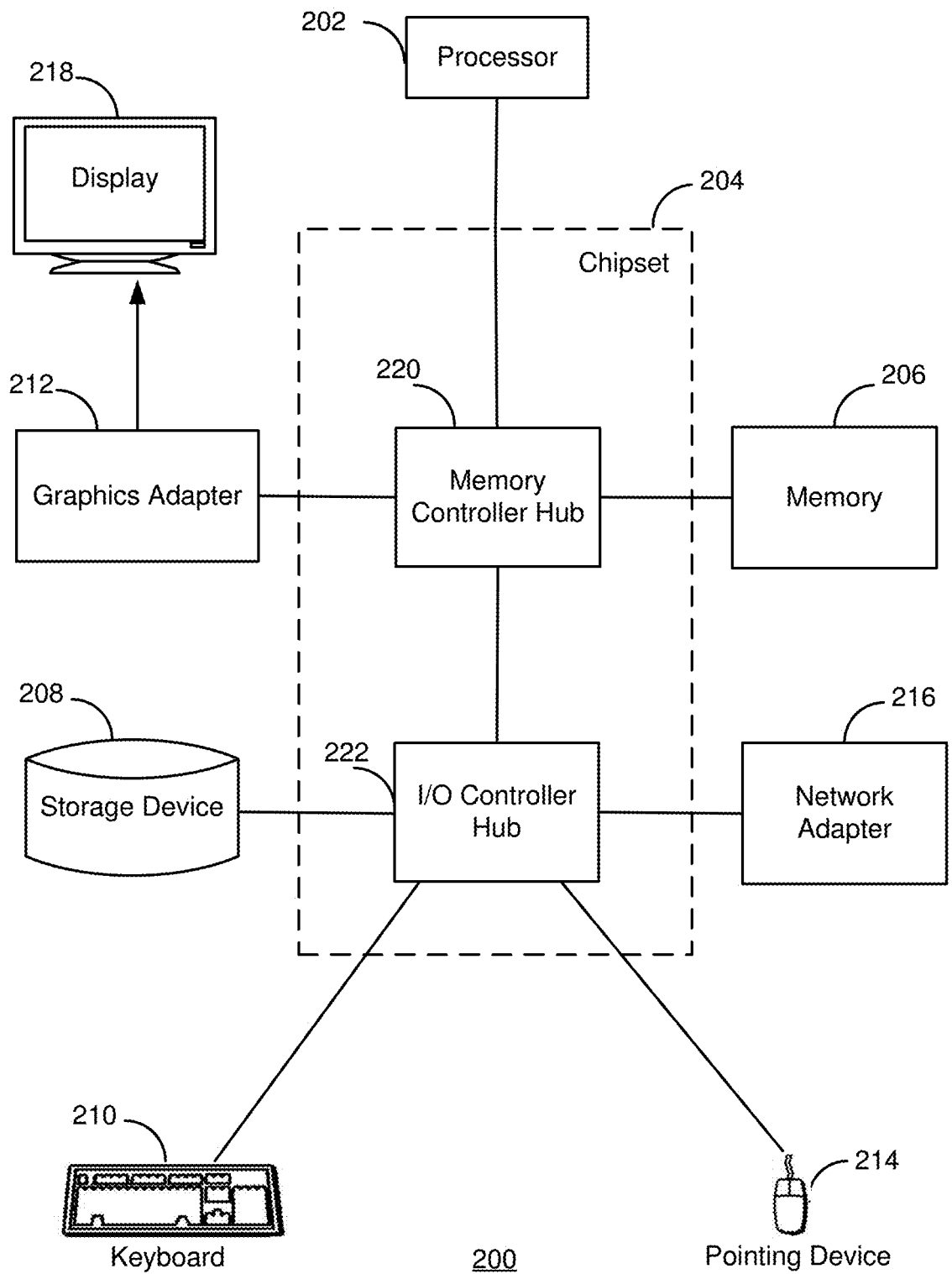
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while the unmanaged device 140 can be a notebook or desktop computer, a tablet computer, or a mobile phone.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

Figure 3:
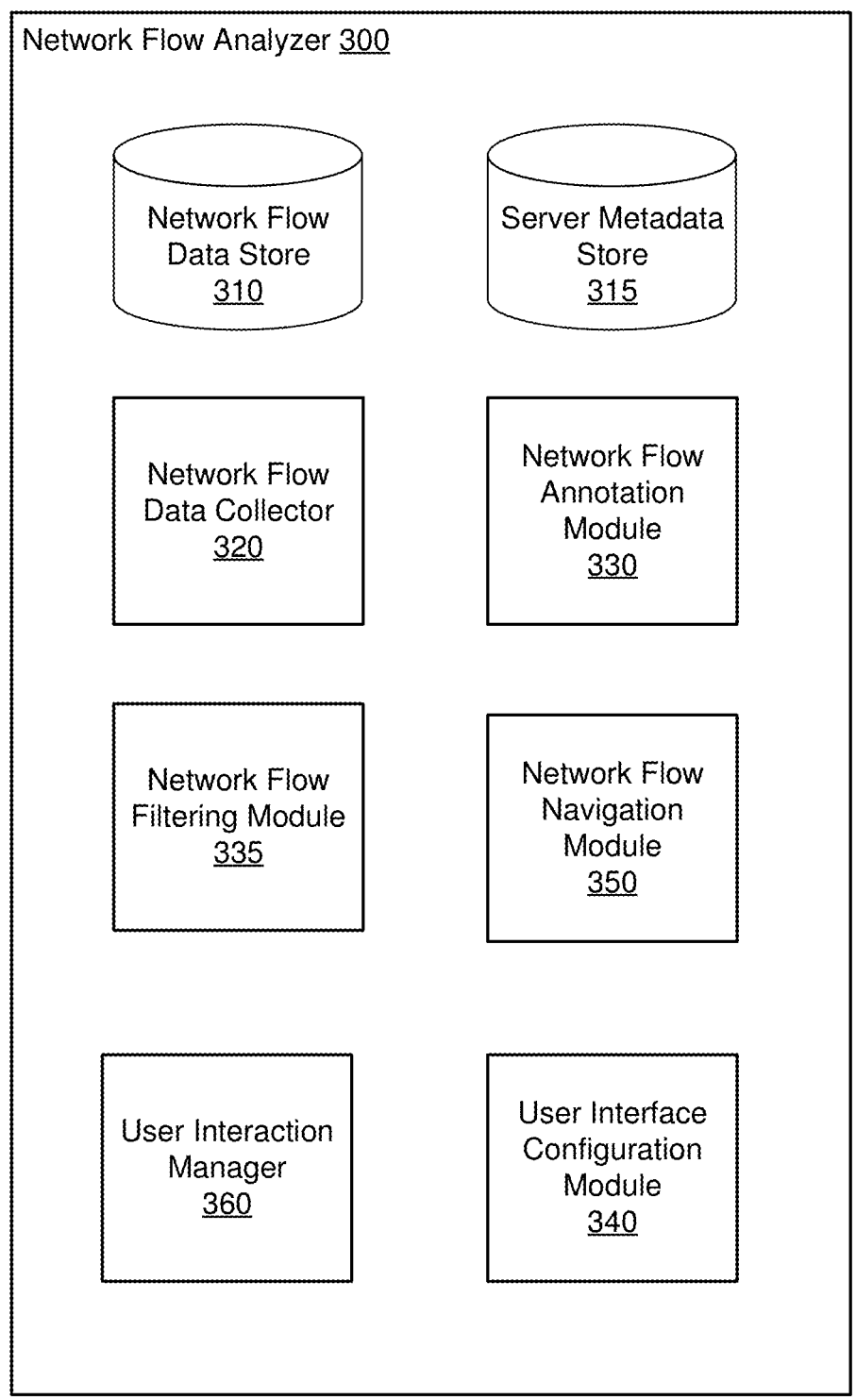
FIG. 3 is a high-level block diagram illustrating a detailed view of a network flow analyzer, according to an embodiment.

FIG. 3 is a high-level block diagram illustrating a detailed view of the network flow analyzer 300 according to one embodiment. The network flow analyzer 300 comprises a network flow data store 310, a server metadata store 315, a network flow data collector 320, a network flow annotation module 330, a network flow filtering module 330, a user interface configuration module 340, a network flow navigation module 350, a user interaction manager 360. In other embodiments, the network flow analyzer 300 may include more or fewer modules than those indicated in FIG. 3. Functionality indicated herein as being performed by a module may be performed by other modules than those indicated herein.

The network flow data store 310 receives network flow data comprising communications between servers from the network flow data collector 320 and stores the network flow data. The network flow data collected by the network flow data collector 320 comprises low level communication information, for example, an address of a source server sending the communication, an address of the destination server receiving the communication, an address of a port on which the communication was received, a protocol used for performing the communication, and so on. In an embodiment, the network flow datastore 310 stores aggregated communication information between pairs of servers. For example, the network flow datastore 310 may store the total number of communications sent from a source server to a destination server rather than each individual communication sent by the source server to the destination server. Accordingly, for each new communication from the source server to the destination server identified by the network flow data collector 320, the network flow data store 310 updates the count of communications rather than store all the data describing the communication. The network flow datastore 310 further stores annotations to the network flow data received from the network flow annotation module 330. These annotations comprise labels describing dimensions of the source server and destination servers associated with the communication. In an embodiment, the network flow data store 310 is implemented as a distributed database comprising a plurality of database systems such that each of the plurality of database system processes a portion of the network flow data. Each of the plurality of database systems may be an in-memory database system. Accordingly, the distributed database comprising the plurality of database systems act as a cache for providing fast access to the network flow data.

The server metadata store 315 stores metadata describing various servers. A server may be a managed server or an unmanaged device (or unmanaged server). The metadata describing a server includes any labels associated with the server, network interfaces associated with the server, and so on. The labels associated with a server may be assigned by a user, for example, a system administrator or automatically generated by a server or the global manager, for example, as a result of state changes within the server. In an embodiment, the data of the server metadata store 315 is stored in a relational database.

The network flow data collector 320 receives information describing communications between servers and stores the information in the network flow data store 310. The network flow data collector 320 may be implemented as a web service. In one embodiment, when a source server sends a communication via network to a destination server, network flow data collector 320 receives information describing the communication from the source server and stores the information in the network flow data store 310. These communications are referred to as "network flows." The information describing the communication may include a flag indicating whether the communication was accepted by a server or blocked by a server. For example, a policy implemented by a destination server may block certain communications based on certain criteria. The server may receive the communication and block it such that the communication is not delivered to a software module to which the communication was targeted. The network flow data collector 320 receives information describing the communication from the server that indicates that the communication was blocked. Similarly, the server may accept the communication and deliver the communication to a software module to which the communication was targeted. In this case, the network flow data collector 320 receives information describing the communication from the server that indicates that the communication was accepted.

In an embodiment, each server aggregates information describing communications sent by the server. The network flow data collector 320 periodically receives the aggregated data describing the communications from the server and stores the data in the network flow data store 310.

The network flow data collector 320 parses the network flow data describing communications between servers and adds information describing the communications into a set of hash data structures. The data describing a communication specifies information identifying the source and destination servers of the communication. For example, the data describing a communication may specify a source server network address and a destination server network address. The server network address may be specified as an internet protocol address (IP address). The attributes describing a communication include a source server identifier (if known), a destination server identifier (if known), a firewall rule identifier, a policy decision as an enumerated value, a service name (if reported), a process name (if reported), a user name (if reported), and so on. The cumulative counters include total number of communications since a given point in time, a count of all accepted communications, a count of all blocked communications, or counts based on other communications that satisfy specific criteria.

The network flow data collector 320 resolves the network address of a server to identify an object representing the server, for example, an object stored in a cache implemented as a distributed database. Accordingly, the network flow data collector 320 identifies objects representing the source and destination servers from their network addresses. In an embodiment, the network flow data collector 320 maintains an event queue for notifying other services when new information is available.

In an embodiment, the network flow data collector 320 identifies each reported communication (or network flow) by a unique string encoding the information describing the communication. The information describing the communication received by the network flow data collector 320 include information identifying the server, source network address, destination network address, destination port number, network protocol used for the communication, and so on. The network flow data collector 320 uses the unique string generated based on the communication as a key for storing information in a data structure, for example, a hash table.

The network flow annotation module 330 preprocesses network flow data in preparation for hierarchical navigation of the network flow data. The network flow annotation module 330 combines network flow data representing communications between servers with server metadata comprising labels describing high level characteristics of the servers to generate annotated network flow data. The annotated network flow data comprises information describing communications along with labels describing the dimensions of the servers performing the communications, for example, labels describing the source server and the destination server of communications. In an embodiment, the network flow annotation module 330 stores the annotated network flow data as a database table in the network flow data store 310.

Figure 10:
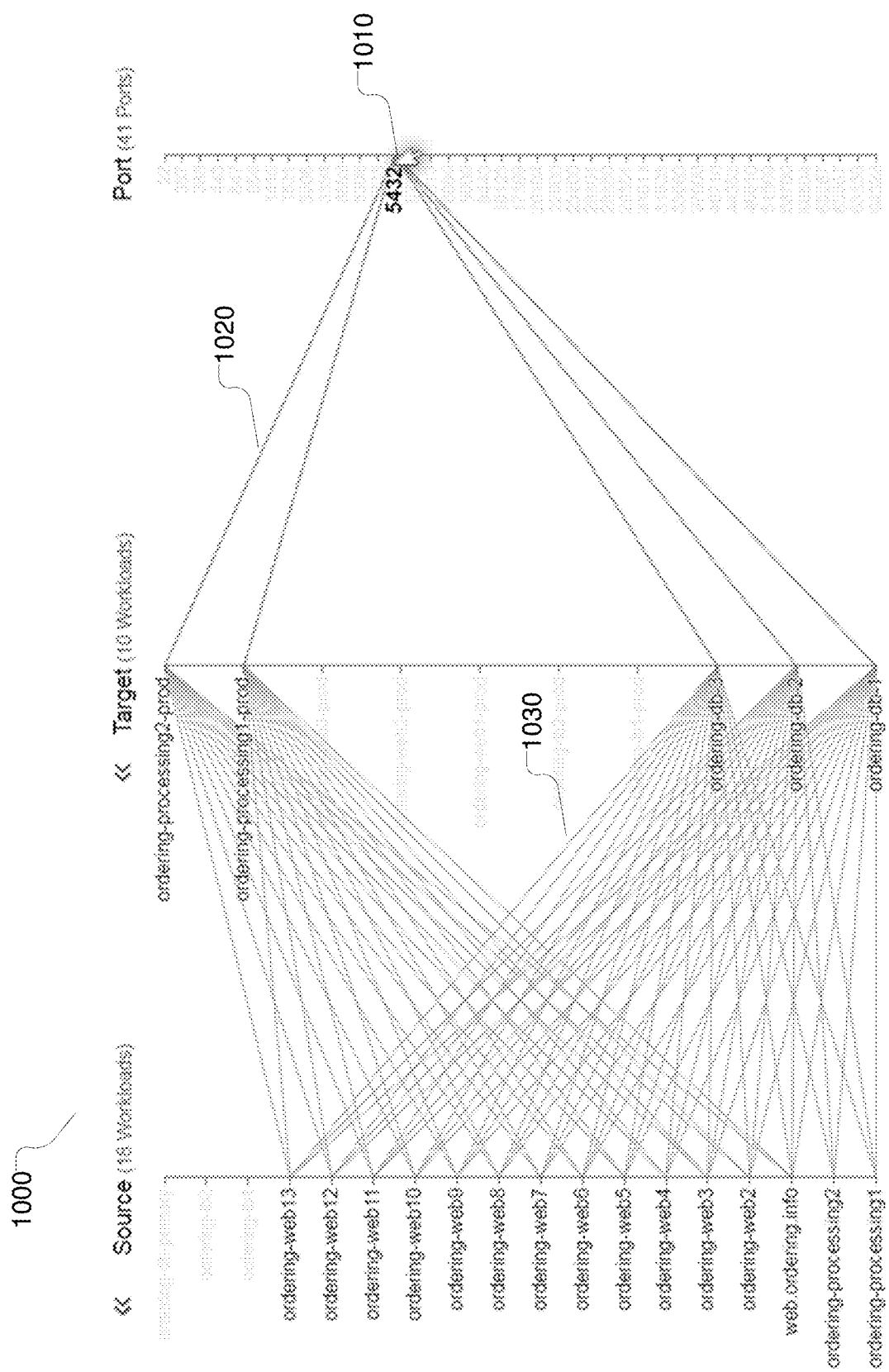
FIG. 10 shows a user interface for highlighting network flow data selected via the user interface, according to an embodiment.

The network flow filtering module 330 receives and processes requests for filtering the network flow data based on various criteria, for example, filtering conditions based on labels describing the source servers or destinations servers associated with communications. The network flow filtering module 330 may receive a request for filtering network flow data via a user interface presented via the client application 165. The network flow filtering module 330 sends results of requests for filtering for presentation via the user interface presented via the client application 165. The network flow filtering module 330 also provides the filtered network flow data for further processing by the network flow navigation module 350. For example, a security analyst may identify a potential security issue associated with a set of communications between a set of source servers and a set of destination server. The security analyst may filter the network flow data to be able to focus on the identified set of communications while temporarily removing the remaining communications from the analysis. User interfaces configured to allow a user to specify filtering criteria are further described herein, for example, as illustrated in FIG. 10.

The user interface configuration module 340 configures user interfaces for performing various user interactions that help a security analyst analyze the network flow data. These user interactions include interactions for filtering network flow data and interactions involving navigation through the network flow data. In an embodiment, the user interface configuration module 340 generates markup language documents, for example, hypertext markup language (HTML) documents, extensible markup language (XML) documents, or documents represented in any other markup language. The user interface configuration module 340 sends the configured user interfaces to a client device 160 for presentation via a client application 165 executing on the client device. In an embodiment, the client application 165 executing on the client device 160 renders the user interface based on the markup language document received. An example of a client application is a browser application, for example, an internet browser that renders HTML documents. In some embodiments, the client application 165 executing on a client device 160 is a proprietary client application and the user interface configuration module 340 configures the user interfaces using a proprietary format. In one embodiment, the user interface configuration module 340 presents network flow data using a parallel coordinate graph representation comprising a plurality of axes and lines connecting pairs of data points such that each data point is on a different axis.

The network flow navigation module 350 receives requests that allow hierarchical navigation of network flow data and processes the requests. For example, the network flow navigation module 350 processes request for expanding data points along an axis or collapsing data points along an axis by determining the new data points for the axis and provides the data points to the user interaction manager 360 for presenting to the user interface configuration module 340. Further details of the operations performed by the network flow navigation module 350 are described herein.

The user interaction manager 360 receives user interactions comprising requests made via a user interface and invokes the appropriate modules for processing the requests. For example, the user interaction manager 360 may receive a request for presenting a visual representation of network flow data and presents a user interface comprising a chart or any other graphical representation of the network flow data via the user interface. The user interaction manager 360 receives requests for performing hierarchical navigation of the network flow data. In one embodiment, the user interface configuration module 340 presents network flow data using a parallel coordinate graph representation that comprises a plurality of axes and lines connecting data points of the axis. The user interaction manager 360 receives requests for expanding data points along an axis or collapsing data points along an axis. The user interaction manager 360 presents more details data in response to a request to expand data points along an axis and presents summarized data in response to a request to collapse data along an axis. The user interaction manager 360 invokes the network flow navigation module 350 for processing the requests to generate data points along an axis and sends the information describing the data points to the user interface configuration module 340. Further details of the processing of the requests for expanding data points along an axis or collapsing data points along an axis are described herein.

Overall Process for Hierarchical Navigation of Network Flow Data

FIGS. 4-7 illustrate various processes according to various embodiments. These processes are performed by the network flow manager 300 in one embodiment. The steps of the processes may be performed by other entities in other embodiments. Furthermore, the steps may be performed in an order different from those indicated herein.

Figure 4:
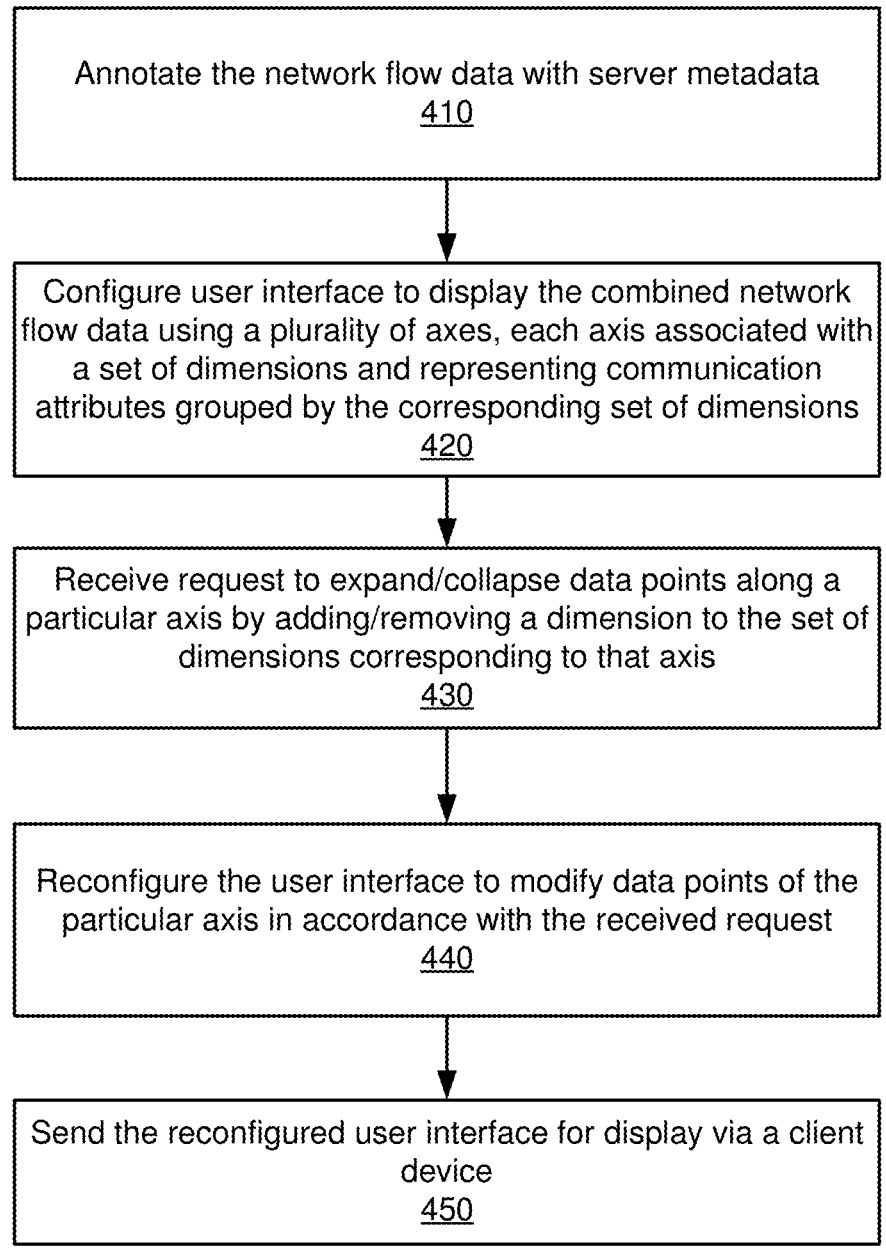
FIG. 4 shows a flowchart illustrating the overall process of interactive hierarchical navigation through network flow data, according to an embodiment.

FIG. 4 shows a flowchart illustrating the overall process of interactive hierarchical navigation through network flow data, according to an embodiment. The network flow annotation module 330 annotates 410 the network flow data with server metadata comprising labels describing various high-level characteristics of the servers. The annotated network flow data for a communication from a source server to the destination server includes labels describing the source and destination servers along with the communication information. Annotating the network flow data with server metadata allows for efficient processing of requests for filtering communication data using criteria based on dimensions of the source and destination servers, for example, filtering requests received from the user interaction manager 360 as specified by a user via a user interface displayed via a client application 165 executing on a client device 160. This allows the network flow analyzer 300 to efficiently filter communications associated with servers having particular characteristics. For example, the network flow analyzer 300 can efficiently identify all communications for servers having a particular role to server having another role. As another example, the network flow analyzer 300 can efficiently aggregate communication using different dimensions, for example, by grouping communications by role or grouping communications by role and environment.

The network flow analyzer 300 sends the network flow data for presentation via a user interface of a client device. The network flow analyzer 300 may visualize the network flow data in a chart form. In an embodiment, the network flow analyzer 300 visualizes the network flow data as parallel coordinate graphs that comprises a plurality of axes that are displayed parallel (or substantially parallel) to each other with lines connecting data points between the axes. The network flow analyzer 300 receives and processes user interactions for hierarchical navigation through the network flow data along the various dimensions describing the servers.

The network flow analyzer 300 configures 420 a user interface to display the annotated network flow data. The user interface comprises a plurality of axes, each axis representing an attribute describing communications (also referred to as a communication attribute), for example, a source server of the communication, a destination server of the communication, a port to which the communication was sent, a protocol used for the communication, and so on. The network flow analyzer 300 associates each axis with a set of dimensions. The data points along each axis represent communication attributes grouped by the corresponding set of dimensions. A dimension represents a characteristic of servers. A label associated with a server identifies a dimension and specifies a value for the dimension. For example, a label may be represented as a name-value pair where the name identifies a dimension and the value specifies the value of the dimension for the server. A dimension may be referred to herein as a server dimension or a label dimension. The user interface may comprise a source axis representing source servers associated with communications and a destination axis representing destination servers associated with communications. The source axis may be associated with dimensions "role" and "environment." Accordingly, data points of the source axis represent source servers associated with communications grouped by roles and environments. Accordingly, each data point of the source axis represents all communications having a source server having a particular role value and a particular environment value. For example, data points along the source axis include a first data point representing source servers with "web" role and "production" environment, a second data point representing source servers with "web" role and "development" environment, a third data point representing source servers with "database" role and "production" environment, a fourth data point representing source servers with "database" role and "development" environment, and so on.

The network flow analyzer 300 receives 430 a request for navigation through the network flow data via dimensions associated with servers. The request is associated with an axis representing a communication attribute. For example, the network flow analyzer 300 may receive a request for either expanding the data points of an axis along a particular dimension or collapsing the data points along a particular dimension. The network flow analyzer 300 invokes the network flow analyzer 300 to process the request to modify data points of the axis. The network flow analyzer 300 identifies a new set of data points for the axis based on the request.

The network flow analyzer 300 reconfigures 440 the user interface to display the annotated network flow in accordance with the request. Accordingly, the network flow analyzer 300 configures the user interface using the new set of data points and lines connecting data points from the new set with data points of other axes. The network flow analyzer 300 sends the reconfigured user interface to the client device for display. These steps (420, 430, 440, and 450) may be repeated upon request by user to allow navigation along various dimensions.

Figure 5:
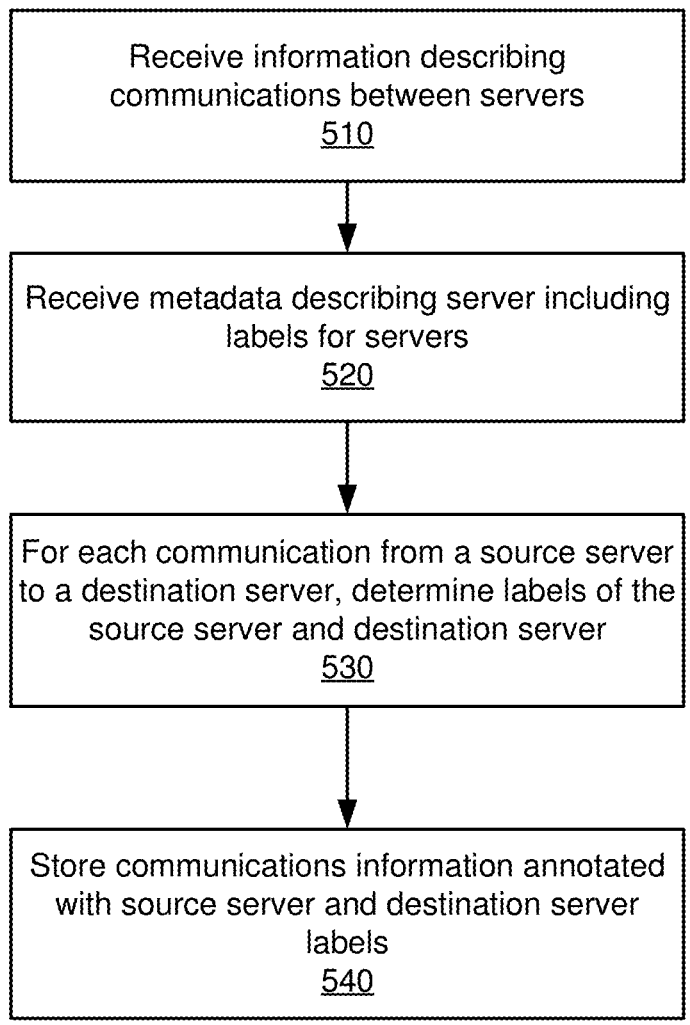
FIG. 5 shows a flowchart illustrating the process of merging communication data with server metadata, according to an embodiment.
Figure 6:
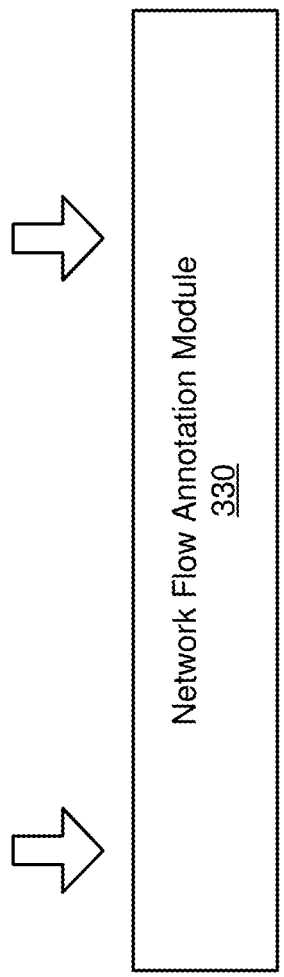
FIG. 6 illustrates with an example, the process of merging communication data with server metadata, according to an embodiment.
Figure 7:
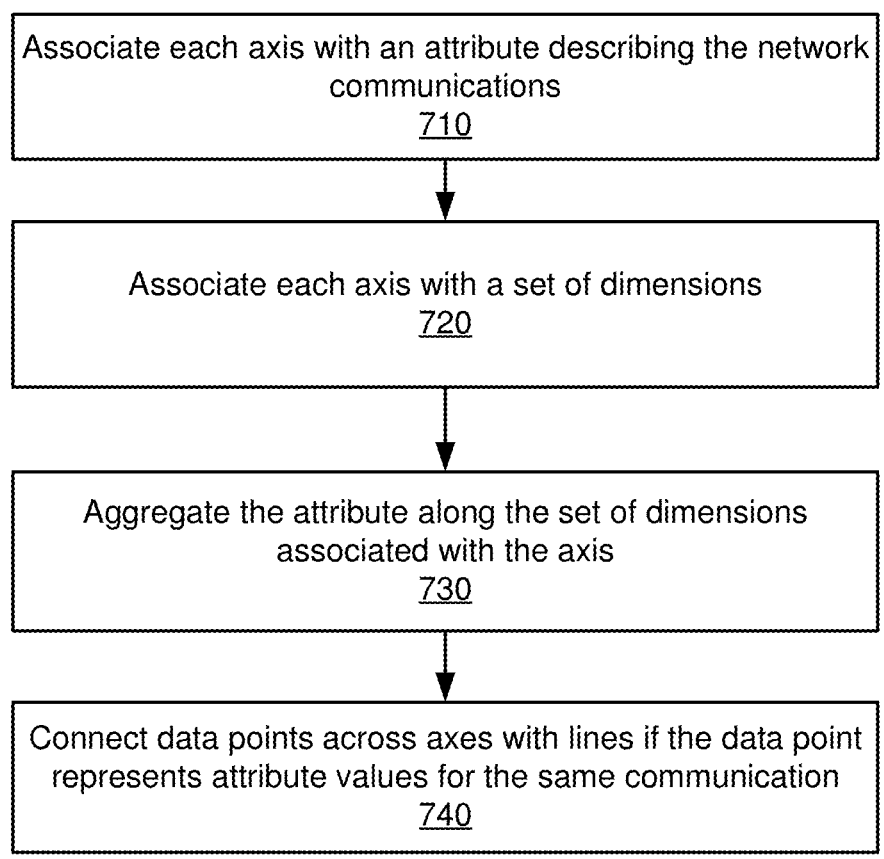
FIG. 7 shows a flowchart illustrating the process of configuring a user interface to present network flow data, according to an embodiment.

FIGS. 5-7 provide further details of steps of the process shown in FIG. 4. In particular, FIG. 5 describes the details of annotating 410 the network flow data. FIG. 6 shows details of configuring 420 the user interface for allowing navigation of network flow data. FIG. 7 shows details reconfiguring 440 the user interface in response to receiving 430 a request to expand/collapse the network flow data along a dimension.

FIG. 5 shows a flowchart illustrating the process of annotating 410 network flow data by merging communication data with server metadata, according to an embodiment. The network flow analyzer 300 receives 510 network flow information describing communications between servers. The network flow data identifies a source server and a destination server (or target server) for each communication.

The network flow analyzer 300 retrieves information describing the network flow from a source server to a destination server from the network flow data store 310 and metadata describing the source server and destination server from the server metadata store 325. Accordingly, the network flow analyzer 300 determines 530 for each communication between a source server and a destination server, the labels for the source server and the destination server. The network flow analyzer 300 combines the two sets of information to generate annotated network flow information that associates labels describing the source and destination servers with network flow information.

FIG. 6 illustrates, with an example, the process of merging communication data with server metadata, according to an embodiment. FIG. 6 shows a table 610 containing an example of network flow data and a table 620 containing an example of server metadata. The network flow analyzer 300 combines the network flow data 610 with the server metadata 620 to generate the annotated network flow data 630. The annotated network flow data includes communication data as well as labels describing the source server and the destination server.

The annotated network flow data 630 allows efficient processing of requests to filter communication information based on dimensions representing high level characteristics of the source server and destination server. For example, the column src_role of the annotated network flow data 630 specifies the role of the source servers and can be used to filter communications sent by all servers having a particular role. Similarly, the column dst_role specifies the role of the destination servers and can be used to filter communications received by servers having a particular role. This filtering allows a security analyst to focus on specific subsets of communications specified using high level high level characteristics of servers and implement appropriate security policies based on their analysis.

FIG. 7 shows a flowchart illustrating the process of configuring 420 a user interface to present network flow data, according to an embodiment. The process illustrated in FIG. 7 shows details of the step of configuring 420 a user interface comprising a graph or chart for visualizing network flow data. The network flow analyzer 300 associates 710 each axis of the graph with an attribute describing the communications between servers. The network flow analyzer 300 associates 720 each axis of the graph with a set of dimensions. For example, the network flow analyzer 300 may associate 720 an axis of the graph with a set of dimensions {role, environment}. As another example, the user interface configuration module 340 may associate 720 an axis of the graph with a set of dimensions {environment, application, location}.

The network flow analyzer 300 determines values for data points of the axis. In an embodiment, the network flow analyzer 300 aggregates 730 the attribute represented by the axis along the set of dimensions associated with the axis. For example, if the axis represents source servers and the set of dimensions includes role and environment, the network flow analyzer 300 aggregates 530 the source servers along the set of dimensions {role, environment}. Accordingly, the network flow analyzer 300 groups all source servers by the dimensions role and environment. Similarly, if the axis represents destination servers and the set of dimensions is {environment, application, location}, the network flow navigation module 350 aggregates 730 the destination servers along the set of dimensions environment, application, and location. Accordingly, the network flow analyzer 300 groups all destination servers by the dimensions environment, application, and location.

The network flow analyzer 300 connects 740 pairs of data points comprising data points of two different axes with lines if the data points are associated with at least a communication. In the above example, if a data point P1 of the source axis represents a set 51 of set of source servers with a particular value of role and environment and a data point P2 of destination axis represents a set S2 of destination servers with a particular value of environment, application, and location, the network flow analyzer 300 connects the data points P1 and P2 if there is at least a communication from a source server of set 51 to a destination server of set S2.

In an embodiment, the network flow analyzer 300 determines a display attribute of the lines based on communications associated with two data points connected by the line. A display attribute is a characteristic of a line determining the presentation of the line in the user interface. Examples of display attributes include widths of a line, a color of a line, a shading of a line, and so on. The display attribute of a line is determined based on a rate of communications associated with the two data points connected by the line. In an embodiment, the display attribute of a line is determined based on the number of communications associated with the two data points connected by the line that are received during a time period.

In an embodiment, the network flow analyzer 300 determines a width of a line connecting a data point P1 of the source axis with a data point P2 of the destination axis as a value proportionate to a rate of communications from the set of source servers represented by the data point P1 to the set of destination servers represented by the data point P2. In another embodiment, the network flow analyzer 300 determines a color of a line connecting a data point P1 of the source axis with a data point P2 of the destination axis based on a rate of communications from the set of source servers represented by the data point P1 to the set of destination servers represented by the data point P2. The network flow analyzer 300 may determine the color of the line based on a predetermined mapping from ranges or sets of values of aggregated rates of communications from a set of source servers to a set of destination servers to colors. In another embodiment, the network flow analyzer 300 determines a level (or amount) of shading of a line connecting a data point P1 of the source axis with a data point P2 of the destination axis as a value proportionate to the rate of communications from the set of source servers represented by the data point P1 to the set of destination servers represented by the data point P2. In an embodiment, the network flow analyzer 300 determines a color of a line based on whether the connection was allowed or rejected at a particular time, and/or whether the connection is allowed or forbidden by an administrative domain wide policy that is being implemented.

In an embodiment, the user interface includes a port axis representing ports of the destination servers to which communications were directed. The network flow analyzer 300 connects lines between data points of destination axis to data points of port axis. Accordingly, if a destination server associated with a data point P1 of the destination axis receives one or more communications at a particular port represented by point P2 of the port axis, the network flow analyzer 300 connects point P1 and P2 using a line. In an embodiment, an attribute of the line is determined based on a rate of communications or number of communications received by the particular port of the particular destination server.

FIG. 8 shows a flowchart illustrating the process of reconfiguring 440 the user interface in response to a request for hierarchical navigation through network flow data, according to an embodiment. The process illustrated in FIG. 6 shows details of the step of reconfiguring 440 the user interface in response to receiving 430 a request to expand/collapse data points along a particular axis by adding/removing respectively a dimension to the set of dimensions corresponding to that axis. The network flow analyzer 300 modifies 810 the set of dimensions corresponding to the axis, for example, by adding a dimension to the set of dimensions in response to a request to expand the data points or removing a dimension from the set in response to a request to collapse a dimension.

The network flow analyzer 300 determines 820 new data points for the particular axis corresponding to the modified set of dimensions. The network flow analyzer 300 determines 820 a new set of data points by aggregating the attribute represented by the axis along the modified set of dimensions. The network flow analyzer 300 modifies the visual representation of the axis in the user interface by replacing 830 the data points of the particular axis with the new set of data points. The network flow analyzer 300 further replaces 840 the lines connecting the data points of the particular axis with lines connecting the new set of data points. The network flow analyzer 300 sends 850 the reconfigured user interface to a client device for display.

In an embodiment, the network flow analyzer 300 represents each data point of a particular axis is by a tuple, wherein each element of the tuple corresponds to a value of a dimension from the set of dimensions associated with the particular axis. If the set of dimensions has N dimensions, the tuples representing data points of the axis include N elements. If the network flow analyzer 300 adds a dimension to the set of dimensions associated with the particular axis, resulting in N+1 dimensions in the set of dimensions, the tuples representing data points of the axis have N+1 elements. Similarly, if the network flow analyzer 300 removes a dimension from the set of dimensions associated with the particular axis, resulting in N−1 dimensions in the set of dimensions, the tuples representing data points of the axis have N−1 elements.

Accordingly, if a dimension D is added to the set of dimensions corresponding to the axis, the network flow analyzer 300 replaces a data point P by one or more data points. If the data point P is represented by a tuple T, the network flow analyzer 300 obtains the tuples corresponding to each of the one or more replacement data points by adding an element corresponding to the dimension D to the tuple T. For example, if the tuple T corresponding to data point P has three elements (e1, e2, e3) and is replaced by two new data points P1 and P2, the tuples corresponding to the data points P1 and P2 are (e1, e2, e3, e4) and (e1, e2, e3, e4'). The new elements e4 and e4' added to the tuple T represent values of the dimension D.

Similarly, if a dimension D is removed from the set of dimensions, the network flow analyzer 300 replaces one or more data points P by a single data point P. The network flow analyzer 300 obtains the tuple corresponding to the data point P by removing an element corresponding to the dimension D from the one or more tuples. For example, assume that the tuple T1 and T2 corresponding to data point P1 and P2 are (e1, e2, e3) and (e1, e2, e3') respectively and dimension D represents the third element of the tuple. If the network flow analyzer 300 receives a request to collapse the data points along dimension D, the network flow analyzer 300 replaces the data points P1 and P2 with a new data point P represented by tuple (e1, e2). Accordingly, if the data points are collapsed along dimension D for an axis, data points having the same values of the remaining dimension associated with the axis are combined into a single data point.

The network flow analyzer 300 accordingly performs expanding or contracting of data points displayed along an axis in response to user requests. The network flow analyzer 300 contracts a set of data points by aggregating the set of data points along a particular dimension into one data point. The network flow analyzer 300 expands an aggregated data point into a set of data points that were used to determine the aggregated data point and displays the set of data points.

In an embodiment, the user interface configured by the network flow analyzer 300 receives requests for filtering the set of communications for navigation. The network flow analyzer 300 receives requests for filtering the network flow data and determines the subset of the network flow data for further processing. The network flow analyzer 300 allows a security analyst to specify requests for filtering using labels describing the source servers and destination servers. The ability to filter network flow data allows a system administrator to identify security issues by focusing on specific subsets of network flow data that correspond to anomalies in the network flow data. The ability to filter network flow data allows a security analyst to remove data that may not be relevant to a security issue from consideration and focus on specific portions of the network flow data. The user interface presented via the client application 165 allows filtering of network flow data using a widget as shown in FIG. 9 or by using the visual representation of the network flow data as shown in FIG. 10.

Figure 9:
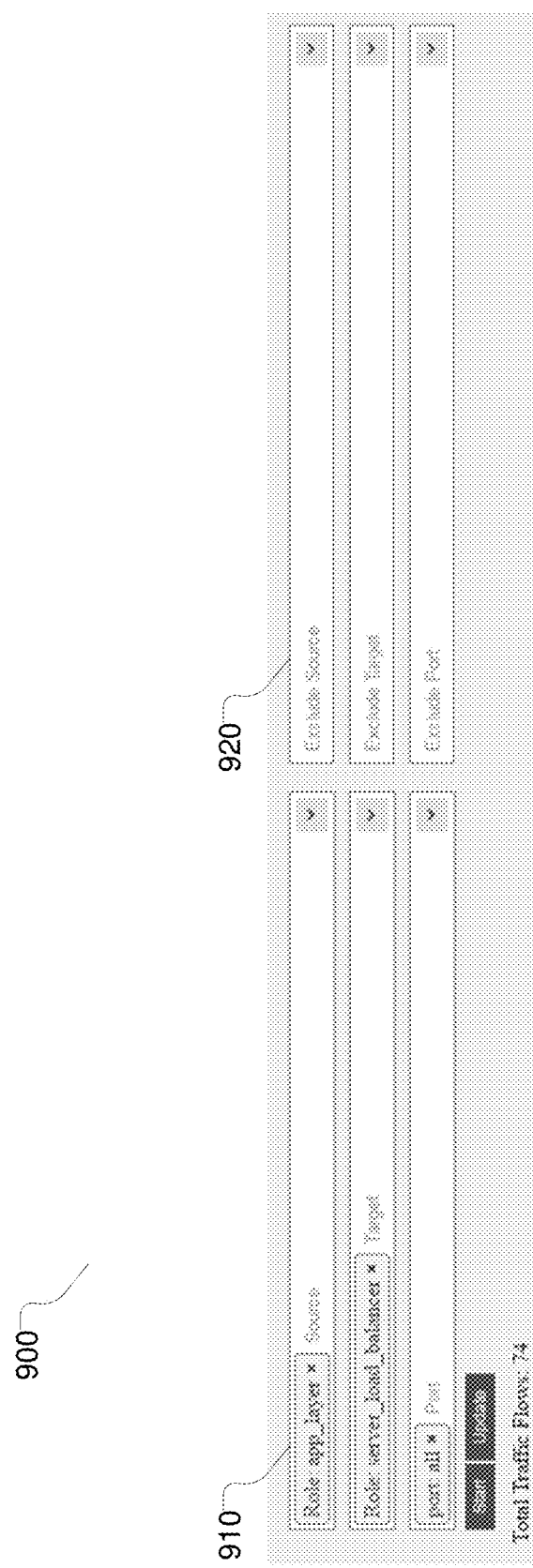
FIG. 9 shows a user interface for filtering the analyzed set of communications, according to an embodiment.

FIG. 9 shows a user interface for filtering the set of analyzed communications, according to an embodiment. The user interface 900 comprises widgets that allow a user to specify filtering criteria. As shown in FIG. 9, the user interface 900 includes widgets 910 that allow a user to specify a filtering criterion for each axis. Accordingly, if the network flow data is represented using three axes including a source axis, a destination axis, and a port axis, the user interface 900 includes a widget 910 for specifying a filtering criterion using attributes of each axis. The filtering criteria are specified by selecting dimensions and specifying values for the selected dimensions. The widgets 910 may be used by a security analyst in a preprocessing step for selecting a subset of data for analysis using the process of FIG. 4. The widgets 910 may also be used to filter data being analyzed for example, to focus on a subset of data during analysis.

The widgets 910 allow a user to analyze a subset of communications that satisfy certain filtering criteria. Accordingly, all communications that match the filtering criteria specified by widget 910 are included in the set of analyzed communications. The widgets 920 allow a user to exclude certain communications. Accordingly, communications that match the filtering criteria specified by widget 920 are excluded from the set of analyzed communications.

In an embodiment, a user selects a subset of communications by visually selecting data points displayed via a user interface. FIG. 10 shows a user interface for highlighting network flow data selected via the user interface, according to an embodiment. Accordingly, the user interface 1000 allows a user to select one or more data points, for example, data point 1010. The user interface highlights all lines connecting the selected data point 1010. The user interface 1000 highlights lines 1020 that are directly connected to the data point 1010 as well as lines 1030 that are indirectly connected to the data point 1010. In an embodiment, the user interface 1000 receives input from user indicating that the user requests further analysis of the communications associated with the selected set of data points. A security analyst may use the functionality of visually selecting data points to select a subset of data to focus on a subset of data during analysis and eliminate the remaining data for purposes of analysis.

User Interfaces for Hierarchical Navigation of Network Flow Data

Figure 11:
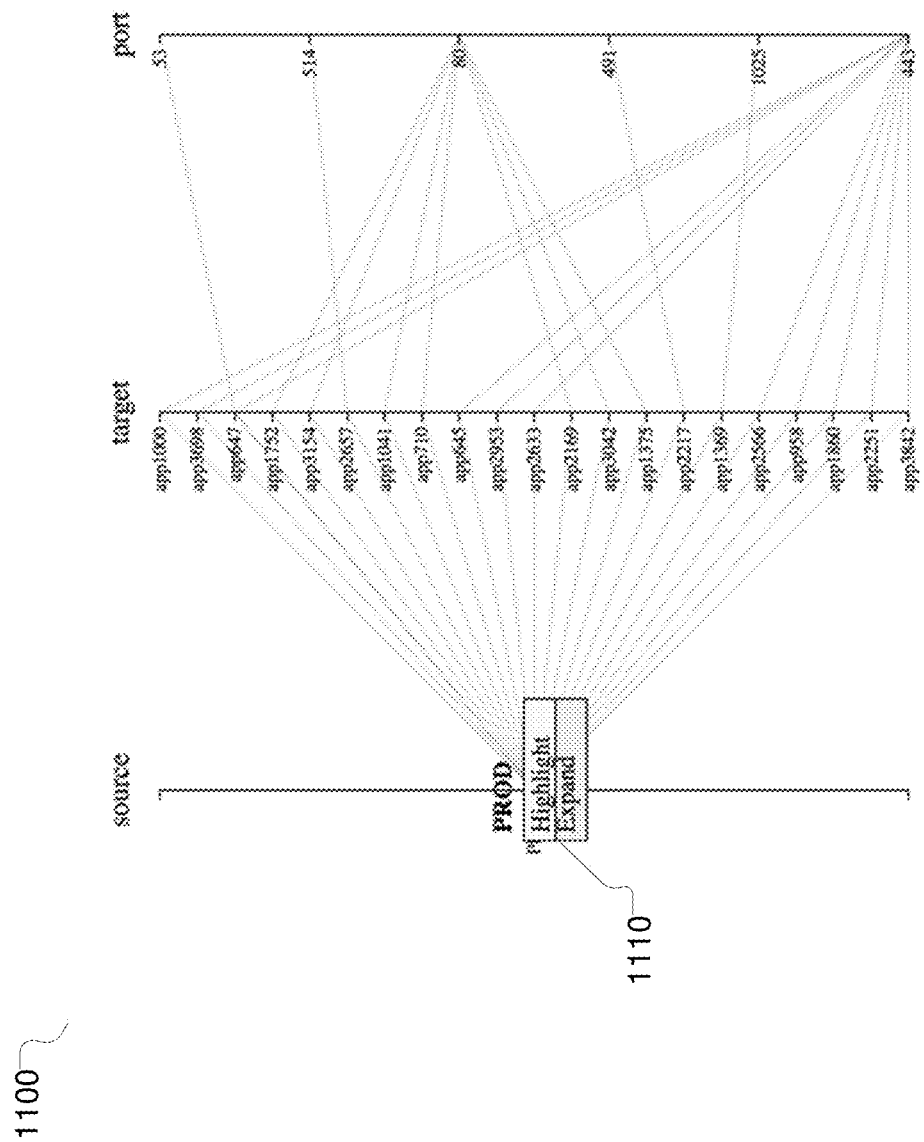
FIG. 11 shows a user interface showing network flow data grouped by certain dimensions, according to an embodiment.

FIG. 11 shows a user interface illustrating a widget for requesting expanding/collapsing along a dimension, according to an embodiment. The widget 1110 provides the user with various options to select an action associated with an axis. The widget 1110 allows users to select actions associated with the source axis. The actions shown by the widget 1110 are "highlight" and "expand." In other embodiments additional actions may be shown. In an embodiment, the user interface 1100 allows the user to select one or more dimensions associated with the action selected. For example, if the user selects the "expand" option for an axis, the user interface 1100 shows a list of dimensions from which the user can select a dimension along which the data points should be expanded. If the axis is associated with a set of dimensions, and the user selects the "expand" option for the axis, the user interface 1100 shows the list of remaining dimensions (not included in the set of dimensions) for letting the user select a dimension along which data points should be expanded. Similarly, if the user selects the "collapse" option for an axis, the user interface 1100 shows a list of dimensions from which the user can select a dimension along which the data points should be collapsed. If the axis is associated with a set of dimensions, and the user selects the collapse option for the axis, the user interface 1100 shows the list of dimensions included in the set of dimensions for letting the user select a dimension along which data points should be collapsed.

Figure 12:
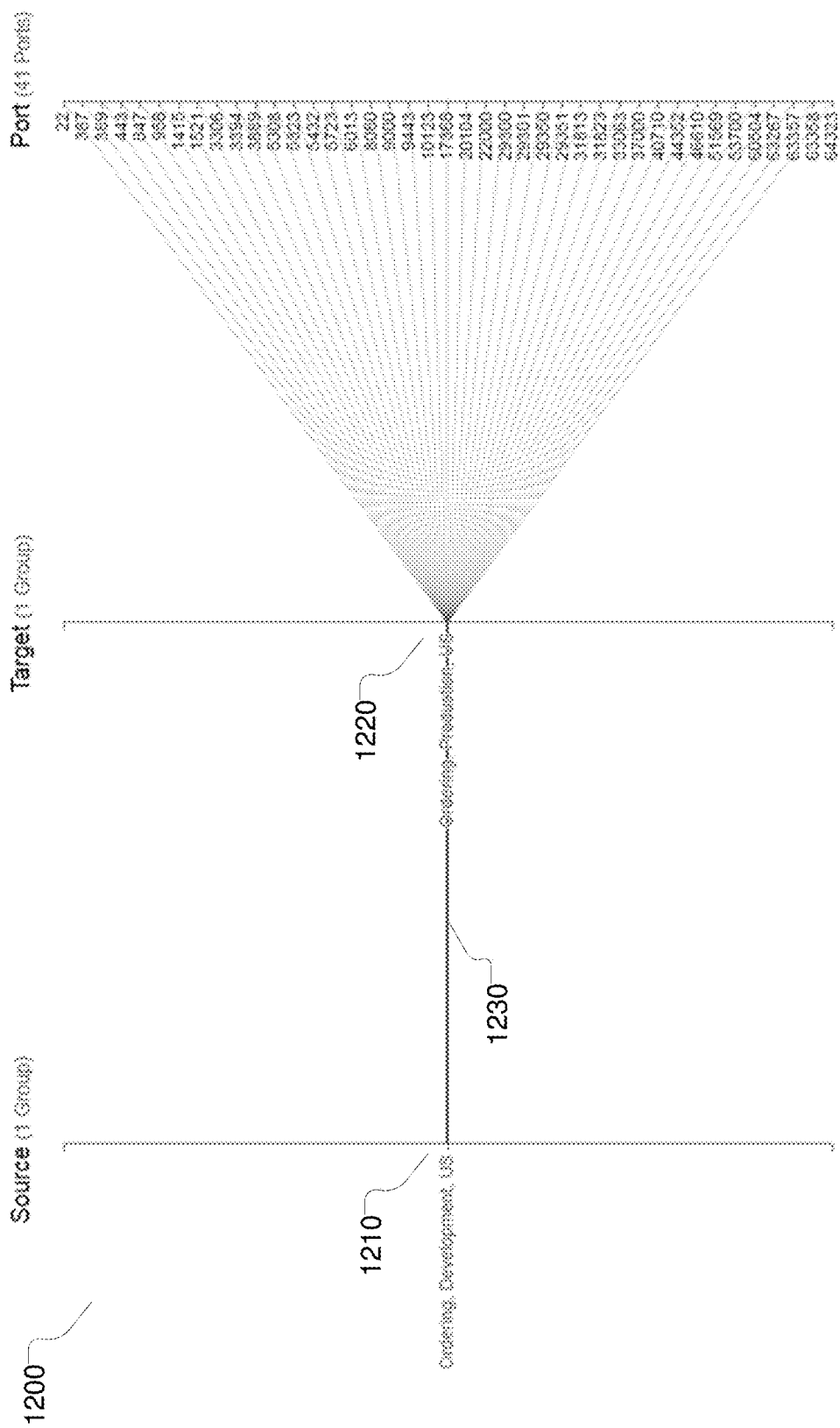
FIG. 12 shows a user interface showing network flow data expanded along a particular dimension, according to an embodiment.
Figure 13:
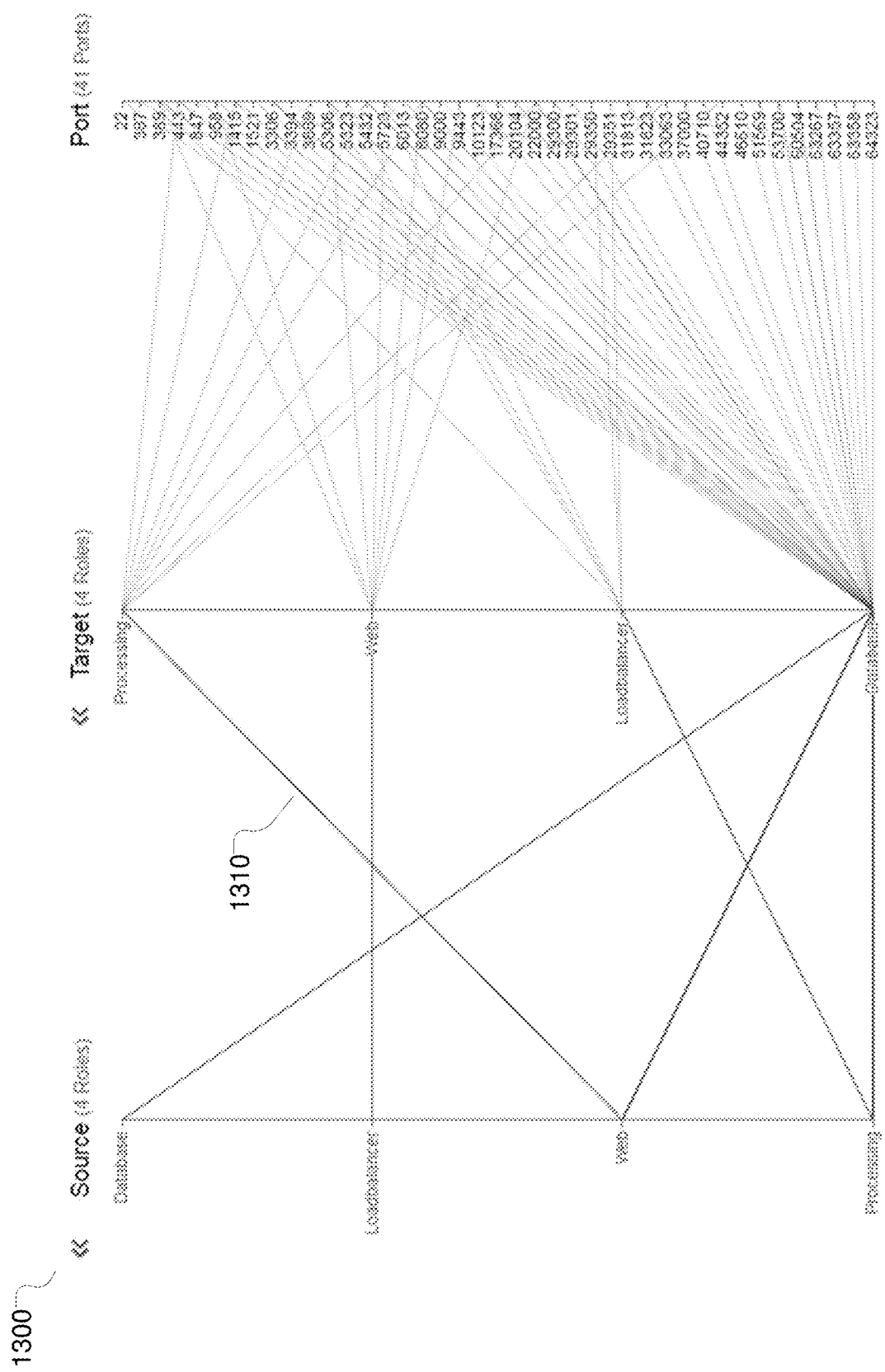
FIG. 13 shows a user interface illustrating a widget for requesting expanding/collapsing along a dimension, according to an embodiment.

FIG. 12 shows a user interface showing network flow data grouped by certain dimensions, according to an embodiment. The data shown in the user interface 1200 may represent the network flow data being analyzed by a security analyst using the process of FIG. 4. For example, the user interface 1200 may represent a user interface configured by the step 420 or a user interface reconfigured by step 440. The user interface 1200 shows axes including a source axis, a target axis (also referred to as a destination axis), and a port axis. The data points along the source axis and the target axis are both grouped by dimensions application, environment, and location. As a result of the grouping, both the source axis and the target axis show a single data point. The data point 1210 of the source axis shows a data point represented by the tuple (ordering, development, us), wherein the dimension application has value "ordering," the dimension environment has value "development," and the dimension location has value "US." The data point 1220 of the target axis shows a data point represented by the tuple (ordering, production, us), wherein the dimension "application" has value "ordering," the dimension "environment" has value "production," and the dimension "location" has value "US." Accordingly, the set of communications comprises communications between servers represented by data points 1210 and 1220. The dimensions used for grouping as shown in FIG. 12 may be selected by the network flow analyzer 300 as default set of dimensions or selected by a security analyst using the client application 165.

FIG. 12 shows a user interface showing network flow data expanded along a particular dimension, according to an embodiment. For example, a security analysts presented with the user interface 1200 shown in FIG. 12 may want to explore details of the communications represented by the line 1230. The security analyst may explore details of the line 1230 by requesting the network flow analyzer 300 to expand one or more of the axes associated with the line 1230. The user interface 1300 shows data points of both the source axis and target axis expanded along the environment dimension. Accordingly both axes show multiple data points, each data point corresponding to a value of the "environment" dimension. The lines 1310 connect data points of the source axis and the target axis. If a user requests the user interface 1300 to collapse data points for the source axis and the target axis along the "environment" dimension, the network flow analyzer 300 would collapse the data points to show the user interface 1200.

In an embodiment, the user interface detects user input indicating that a user is performing a mouse over operation by hovering the mouse over a particular line displayed in the graph. In response to detecting a mouse over operation, the user interface highlights the details of the particular line on which the user is performing the mouse over and dims or deemphasizes other portions of the graph. This allows a user to inspect details of individual lines interactively. In large networks, the user interface may show a dense graph with a large number of lines that are close to each other. The ability to emphasize details of specific lines with a mouse over allows a user to analyze such graphs effectively.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

I claim:

1. A method for hierarchical navigation of network flow data, the method comprising:
    receiving, over a network, network flow data describing communications between servers;
    receiving multi-dimensional labels for each of the different servers, wherein each multi-dimensional label comprises a set of values corresponding to a set of respective server dimensions, wherein a server dimension describes a characteristic of the server;
    annotating the network flow data with the multi-dimensional labels describing the servers associated with the communications;
    storing the annotated network flow data to a database;
    configuring a user interface to display the annotated network flow data from the database using a parallel coordinate graph having a plurality of axes, the configuring comprising:
    configuring the parallel coordinate graph to have a first axis associated with a first set of server dimensions of the multi-dimensional labels;
    identifying a first set of servers each having a first set of label values assigned to the first set of server dimensions associated with the first axis;
    representing the first set of servers as a first data point on the first axis;
    configuring the parallel coordinate graph to have a second axis associated with a second set of server dimensions of the multi-dimensional labels;
    identifying a second set of servers each having a second set of label values assigned to the second set of server dimensions associated with the second axis;
    representing the second set of servers as a second data point on the second axis;
    configuring the parallel coordinate graph to have a third axis associated with a third set of server dimensions of the multi-dimensional labels;
    identifying a third set of servers each having a third set of label values assigned to the third set of server dimensions associated with the third axis;
    representing the third set of servers as a third data point on the third axis;
    determining, based on the network flow data, if at least one of the first set of servers communicates with at least one of the second set servers;
    responsive to determining that at least one of the first set of servers communicates with at least one of the second set of servers, generating a representation of a connection between the first set of servers and the second set of servers as a line connecting the first data point on the first axis to the second data point on the second axis;
    determining, based on the network flow data, if a connection between at least one of the first set of servers and at least one of the third set servers is blocked by a domain wide administrative policy;
    responsive to that the connection is blocked, generating a representation of a blocked connection between the first set of servers and the third set of servers as a line connecting the first data point on the first axis to the third data point on the third axis that is visually distinguished from the line connecting the first data point to the second data point; and
    sending the configured user interface for display via a client device.

2. The method of claim 1, further comprising:
- receiving a request to modify data points along the first axis wherein the request is for: expanding data points along the first axis or collapsing the data points along the first axis;
- reconfiguring the user interface in accordance with the received request, the reconfiguring comprising representing a modified set of data points on the first axis; and
- sending the reconfigured user interface for display via the client device.

3. The method of claim 2, wherein reconfiguring the user interface in accordance with the received request, comprises:
- modifying the first set of server dimensions associated with the first axis in accordance with the received request, the modifying comprising one of: adding a server dimension to the first set of dimensions or removing a server dimension from the first set of server dimensions;
- replacing the data points along the first axis with new data points obtained by aggregating along the modified first set of server dimensions; and
- replacing lines connecting the data points of the first axis to connect the new data points with other axes.

4. The method of claim 3, wherein the received request is a request for expanding data points of the first axis, the method further comprising:
- for each data point along the first axis represented by a first tuple, replacing the data point by one or more data points, wherein each replaced data point is represented by a second tuple, the second tuple comprising elements of the first tuple and an element representing a value of the first server dimension.

5. The method of claim 3, wherein the received request is a request for collapsing data points of the first axis, the method further comprising:
- replacing one or more data points of the first axis with a combined data point, the combined data point represented by a tuple obtained by removing the first server dimension from the tuples representing the one or more data points.

6. The method of claim 1, wherein each communication is from a source server to a destination server, wherein the plurality of axes comprises a source axis representing a source servers of the communications and a destination axis representing destination servers of the communications.

7. The method of claim 6, further configuring for display a port axis wherein a data point on the port axis represents a port of a destination server used for communicating with the destination server, the method comprising:
- configuring for display via the user interface, lines connecting data points on the destination axis with data points on the port axis.

8. The method of claim 6, wherein the user interface comprises lines connecting data points along the source axis with data point along the destination axis, wherein a data point on the source axis represents a set of source servers and a data point on the destination axis represents a set of destination servers.

9. The method of claim 8, wherein a display attribute of lines connecting data points along the source axis with data point along the destination axis is determined based on a rate of communications from the set of source servers to the set of destination servers, wherein the display attribute is one of: a width of the line, a color of the line, or a shading of the line.

10. The method of claim 8, wherein a display attribute of lines connecting data points along the source axis with data point along the destination axis represents whether a connection is allowed or rejected.

11. The method of claim 1, wherein each data point along the first axis is associated with a tuple, wherein each element of the tuple specifies one or more values of a server dimension from the first set of server dimensions.

12. The method of claim 1, wherein the multi-dimensional labels represent one or more of: a role of a server within an administrative domain, an application to which the server belongs, or an environment representing a lifecycle stage associated with a server.

13. A non-transitory computer readable storage medium storing instructions executable by a processor for:
- receiving network flow data describing communications between servers;
- receiving, over a network, network flow data describing communications between servers;
- receiving multi-dimensional labels for each of the different servers, wherein each multi-dimensional label comprises a set of values corresponding to a set of respective server dimensions, wherein a server dimension describes a characteristic of the server;
- annotating the network flow data with the multi-dimensional labels describing the servers associated with the communications;
- storing the annotated network flow data to a database;
- configuring a user interface to display the annotated network flow data from the database using a parallel coordinate graph having a plurality of axes, the configuring comprising:
- configuring the parallel coordinate graph to have a first axis associated with a first set of server dimensions of the multi-dimensional labels;
- identifying a first set of servers each having a first set of label values assigned to the first set of server dimensions associated with the first axis;
- representing the first set of servers as a first data point on the first axis;
- configuring the parallel coordinate graph to have a second axis associated with a second set of server dimensions of the multi-dimensional labels;
- identifying a second set of servers each having a second set of label values assigned to the second set of server dimensions associated with the second axis;
- representing the second set of servers as a second data point on the second axis;
- configuring the parallel coordinate graph to have a third axis associated with a third set of server dimensions of the multi-dimensional labels;
- identifying a third set of servers each having a third set of label values assigned to the third set of server dimensions associated with the third axis;
- representing the third set of servers as a third data point on the third axis;
- determining, based on the network flow data, if at least one of the first set of servers communicates with at least one of the second set servers;
- responsive to determining that at least one of the first set of servers communicates with at least one of the second set of servers, generating a representation of a connection between the first set of servers and the second set of servers as a line connecting the first data point on the first axis to the second data point on the second axis;
- determining, based on the network flow data, if a connection between at least one of the first set of servers and at least one of the third set servers is blocked by a domain wide administrative policy;

responsive to that the connection is blocked, generating a representation of a blocked connection between the first set of servers and the third set of servers as a line connecting the first data point on the first axis to the third data point on the third axis that is visually distinguished from the line connecting the first data point to the second data point; and sending the configured user interface for display via a client device.

14. The non-transitory computer readable storage medium of claim 13, wherein the stored instructions further comprise instructions for:

receiving a request to modify data points along the first axis wherein the request is for: expanding data points along the first axis or collapsing the data points along the first axis;

reconfiguring the user interface in accordance with the received request, the reconfiguring comprising representing a modified set of data points on the first axis; and sending the reconfigured user interface for display via the client device.

15. The non-transitory computer readable storage medium of claim 14, wherein instructions for reconfiguring the user interface in accordance with the received request comprise instructions for:

modifying the first set of server dimensions associated with the first axis in accordance with the received request, the modifying comprising one of: adding a server dimension to the first set of dimensions or removing a server dimension from the first set of server dimensions;

replacing the data points along the first axis with new data points obtained by aggregating along the modified first set of server dimensions; and replacing lines connecting the data points of the first axis to connect the new data points with other axes.

16. The non-transitory computer readable storage medium of claim 15, wherein the received request is a request for expanding data points of the particular axis along the particular server dimension, the stored instructions further comprising instructions for:

for each data point along the first axis represented by a first tuple, replacing the data point by one or more data points, wherein each replaced data point is represented by a second tuple, the second tuple comprising elements of the first tuple and an element representing a value of the first server dimension.

17. The non-transitory computer readable storage medium of claim 15, wherein the received request is a request for collapsing data points of the first axis, the method further comprising:

replacing one or more data points of the first axis with a combined data point, the combined data point represented by a tuple obtained by removing the first server dimension from the tuples representing the one or more data points.

18. A computer system comprising:
one or more processors;
a computer readable non-transitory storage medium storing instructions for execution by the one or more processors, wherein the stored instructions comprise instructions for:
receiving, over a network, network flow data describing communications between servers;

receiving multi-dimensional labels for each of the different servers, wherein each multi-dimensional label comprises a set of values corresponding to a set of respective server dimensions, wherein a server dimension describes a characteristic of the server;

annotating the network flow data with the multi-dimensional labels describing the servers associated with the communications;

storing the annotated network flow data to a database;

configuring a user interface to display the annotated network flow data from the database using a parallel coordinate graph having a plurality of axes, the configuring comprising:

configuring the parallel coordinate graph to have a first axis associated with a first set of server dimensions of the multi-dimensional labels;

identifying a first set of servers each having a first set of label values assigned to the first set of server dimensions associated with the first axis;

representing the first set of servers as a first data point on the first axis;

configuring the parallel coordinate graph to have a second axis associated with a second set of server dimensions of the multi-dimensional labels;

identifying a second set of servers each having a second set of label values assigned to the second set of server dimensions associated with the second axis;

representing the second set of servers as a second data point on the second axis;

configuring the parallel coordinate graph to have a third axis associated with a third set of server dimensions of the multi-dimensional labels;

identifying a third set of servers each having a third set of label values assigned to the third set of server dimensions associated with the third axis;

representing the third set of servers as a third data point on the third axis;

determining, based on the network flow data, if at least one of the first set of servers communicates with at least one of the second set servers;

responsive to determining that at least one of the first set of servers communicates with at least one of the second set of servers, generating a representation of a connection between the first set of servers and the second set of servers as a line connecting the first data point on the first axis to the second data point on the second axis;

determining, based on the network flow data, if a connection between at least one of the first set of servers and at least one of the third set servers is blocked by a domain wide administrative policy;

responsive to that the connection is blocked, generating a representation of a blocked connection between the first set of servers and the third set of servers as a line connecting the first data point on the first axis to the third data point on the third axis that is visually distinguished from the line connecting the first data point to the second data point; and sending the configured user interface for display via a client device.

19. The computer system of claim 18, wherein the stored instructions further comprise instructions for:

receiving a request to modify data points along the first axis wherein the request is for: expanding data points along the first axis or collapsing the data points along the first axis;

reconfiguring the user interface in accordance with the received request, the reconfiguring comprising representing a modified set of data points on the first axis; and sending the reconfigured user interface for display via the client device.

20. The computer system of claim 19, wherein instructions for reconfiguring the user interface in accordance with the received request comprise instructions for:

modifying the first set of server dimensions associated with the first axis in accordance with the received request, the modifying comprising one of: adding a server dimension to the first set of dimensions or removing a server dimension from the first set of server dimensions;

replacing the data points along the first axis with new data points obtained by aggregating along the modified first set of server dimensions; and replacing lines connecting the data points of the first axis to connect the new data points with other axes.

\* \* \* \* \*